US011329908B2

(12) United States Patent
Amend et al.

(10) Patent No.: US 11,329,908 B2
(45) Date of Patent: May 10, 2022

(54) COMMUNICATION DEVICE FOR TRANSMITTING A TRANSMISSION CONTROL PROTOCOL SEGMENT OVER A COMMUNICATION NETWORK USING A MULTIPATH TRANSMISSION CONTROL PROTOCOL

(71) Applicant: DEUTSCHE TELEKOM AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/734,583

(22) PCT Filed: Jun. 3, 2019

(86) PCT No.: PCT/EP2019/064344
§ 371 (c)(1),
(2) Date: Dec. 3, 2020

(87) PCT Pub. No.: WO2019/233946
PCT Pub. Date: Dec. 12, 2019

(65) Prior Publication Data
US 2021/0234794 A1     Jul. 29, 2021

(30) Foreign Application Priority Data
Jun. 7, 2018    (EP) ..................................... 18176515

(51) Int. Cl.
*H04L 12/707*     (2013.01)
*H04L 45/24*     (2022.01)
(Continued)

(52) U.S. Cl.
CPC ............ *H04L 45/24* (2013.01); *H04L 47/193* (2013.01); *H04L 47/24* (2013.01); *H04L 47/28* (2013.01); *H04L 69/14* (2013.01); *H04L 69/163* (2013.01)

(58) Field of Classification Search
CPC ....... H04L 45/24; H04L 47/193; H04L 47/28; H04L 69/163; H04L 47/24; H04L 69/14
See application file for complete search history.

(56) References Cited

U.S. PATENT DOCUMENTS

2016/0212759 A1    7/2016   Schliwa-Bertling et al.
2017/0078206 A1    3/2017   Huang et al.
(Continued)

OTHER PUBLICATIONS

A. Ford, et al., "TCP Extensions for Multipath Operation with Multiple Addresses", Datatracker, https://datatracker.ietf.org/doc/rc8684/, Jan. 21, 2013, pp. 1-64, Internet Engineering Task Force (IETF), Fremont, California, USA, XP015086539A1.
(Continued)

*Primary Examiner* — Mandish K Randhawa
(74) *Attorney, Agent, or Firm* — Leydig, Voit & Mayer, Ltd.

(57) ABSTRACT

A communication device for transmitting a Transmission Control Protocol (TCP) segment over a communication network using a Multipath Transmission Control Protocol (MPTCP) includes: a communication interface configured to establish an MPTCP data flow comprising a plurality of data sub-flows to a further communication device, and to receive a priority indicator from a network entity, wherein the priority indicator indicates a respective priority of a respective data sub-flow; and a scheduler configured to select, for the TCP segment, a data sub-flow from the plurality of data sub-flows based on the priority indicator. The communication interface is further configured to transmit the TCP
(Continued)

segment via the selected data sub-flow to the further communication device.

11 Claims, 7 Drawing Sheets

(51) Int. Cl.
*H04L 47/193* (2022.01)
*H04L 47/24* (2022.01)
*H04L 47/28* (2022.01)
*H04L 69/14* (2022.01)
*H04L 69/163* (2022.01)

(56) References Cited

U.S. PATENT DOCUMENTS

| | | | |
|---|---|---|---|
| 2018/0248784 A1* | 8/2018 | Fukada | H04L 45/24 |
| 2019/0386911 A1* | 12/2019 | Zhu | H04L 47/621 |
| 2020/0259738 A1* | 8/2020 | Wang | H04L 69/163 |

OTHER PUBLICATIONS

Choi Kae Won et al: "Optimal load balancing scheduler for MPTCP-based bandwidth aggregation in heterogeneous wireless environments", Computer Communications, vol. 112, Nov. 1, 2017 (Nov. 1, 2017), pp. 116-130, XP085225325.

Vincent Jacquot: "Test Bed for Multipath TCP", Thesis submitted for examination for the degree of M. Sc. In Technology, School of Electrical Engineering, Espoo, May 22, 2013 (May 22, 2013), pp. 1-57, XP055490109.

* cited by examiner

COMMUNICATION DEVICE FOR TRANSMITTING A TRANSMISSION CONTROL PROTOCOL SEGMENT OVER A COMMUNICATION NETWORK USING A MULTIPATH TRANSMISSION CONTROL PROTOCOL

CROSS-REFERENCE TO PRIOR APPLICATIONS

This application is a U.S. National Phase Application under 35 U.S.C. § 371 of International Application No. PCT/EP2019/064344, filed on Jun. 3, 2019, and claims benefit to European Patent Application No. EP 18176515.7, filed on Jun. 7, 2018. The International Application was published in English on Dec. 12, 2019 as WO 2019/233946 A1 under PCT Article 21(2).

TECHNICAL FIELD

The present invention relates to the field of communication technology, in particular to scheduling of data sub-flows in a Multipath Transmission Control Protocol (MPTCP).

BACKGROUND

The Multipath Transmission Control Protocol (MPTCP) is an extension to the classical Transmission Control Protocol (TCP) for simultaneous usage of several paths from a source to a destination. MPTCP can e.g. be used for robustness purposes or even for capacity aggregation. An integral part of MPTCP is the scheduler on the transmitter side, which is usually responsible to decide, for each TCP segment, which path to use.

A common scheduling approach may e.g. prioritize a path in a strict given order. Such a scheduling behavior may be appreciated in scenarios where less cost intensive paths are combined with expensive ones to save resources. The scheduler may e.g. stop using a low priority path and switch to a higher prioritized path. However, such a scheduling approach may not cover the case that multiple paths are bundled for capacity aggregation in combination with traffic prioritization.

In J. Postel, "Transmission Control Protocol", RFC no. 793, September 1981, principles of the classical Transmission Control Protocol, TCP, are described. In A. Ford et al., "TCP Extensions for Multipath Operation with Multiple Addresses", RFC no. 6824, January 2013, principles of the Multipath Transmission Control Protocol, MPTCP, are described. In US 2016/0212759 A1, an MPTCP scheduling approach is described.

SUMMARY

In an exemplary embodiment, the present invention provides a communication device for transmitting a Transmission Control Protocol (TCP) segment over a communication network using a Multipath Transmission Control Protocol (MPTCP). The communication device includes: a communication interface configured to establish an MPTCP data flow comprising a plurality of data sub-flows to a further communication device, and to receive a priority indicator from a network entity, wherein the priority indicator indicates a respective priority of a respective data sub-flow; and a scheduler configured to select, for the TCP segment, a data sub-flow from the plurality of data sub-flows based on the priority indicator. The communication interface is further configured to transmit the TCP segment via the selected data sub-flow to the further communication device.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
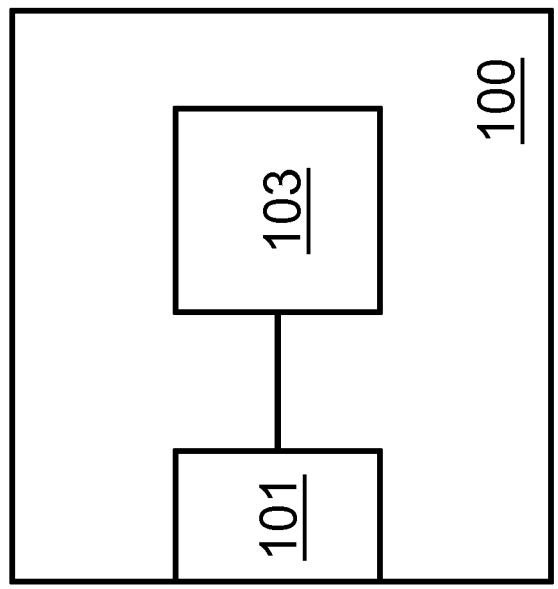
FIG. 1 shows a schematic diagram of a communication device.

Exemplary embodiments of the invention provide efficient scheduling for a Transmission Control Protocol (TCP) segment using a Multipath Transmission Control Protocol (MPTCP).

In an exemplary embodiment, a scheduler of a communication device may use at least one priority indicator indicating a respective priority of a respective data sub-flow of an MPTCP data flow, and may decide, based on the at least one priority indicator, which data sub-flow to use for transmitting a TCP segment. The scheduler may further use at least one latency indicator indicating a respective latency of a respective data sub-flow, and may further decide, based on the at least one latency indicator, which data sub-flow to use for transmitting the TCP segment. The at least one priority indicator may e.g. be provided by a network entity, which may determine the priorities of the data sub-flows based on cost parameters. The at least one priority indicator may, alternatively or additionally, be stored in a memory of the communication device. The at least one priority indicator may serve as a primary criterion for selecting the data sub-flow; the at least one latency indicator may serve as a secondary criterion for selecting the data sub-flow.

According to a first aspect, the invention relates to a communication device for transmitting a Transmission Control Protocol (TCP) segment over a communication network using a Multipath Transmission Control Protocol (MPTCP). The communication device comprises a communication interface configured to establish an MPTCP data flow comprising a plurality of data sub-flows to a further communication device, and to receive at least one priority indicator from a network entity, wherein the at least one priority indicator indicates a respective priority of a respective data sub-flow. The communication device further comprises a scheduler configured to select, for the TCP segment, a data sub-flow from the plurality of data sub-flows based on the at least one priority indicator. The communication interface is configured to transmit the TCP segment via the selected data sub-flow to the further communication device.

A respective priority indicator may represent a respective priority e.g. in terms of a numerical value within a predetermined range. The predetermined range may e.g. be defined by the interval [0; 1], wherein "0" may represent a high priority and "1" a low priority, or vice versa.

In an embodiment, the communication device comprises a memory configured to store at least one priority indicator, wherein the at least one priority indicator indicates a respective priority of a respective data sub-flow. Thus, the at least one priority indicator may efficiently be provided.

A respective priority indicator may represent a respective priority e.g. in terms of a numerical value within a predetermined range. The predetermined range may e.g. be defined by the interval [0; 1], wherein "0" may represent a high priority and "1" a low priority, or vice versa.

In an embodiment, the scheduler is configured to generate at least one priority indicator indicating at least one pre-defined priority, and to associated the generated at least one priority indicator with a respective data sub-flow. Thus, a priority indicator may subsequently be provided for a data sub-flow, which has no associated priority indicator as received from the network entity or as stored in the memory. The predefined priority may e.g. be a maximum priority or a minimum priority.

A respective priority indicator may represent a respective priority e.g. in terms of a numerical value within a predetermined range. The predetermined range may e.g. be defined by the interval [0; 1], wherein "0" may represent a high priority and "1" a low priority, or vice versa.

In an embodiment, the selected data sub-flow is associated with the highest priority. Thus, the TCP segment is transmitted via the data sub-flow being associated with the highest priority. Transmission via the remaining data sub-flows may be suspended.

In an embodiment, the scheduler is configured to determine, for the TCP segment, a respective availability status of each data sub-flow of the plurality of data sub-flows, and to discard, for the TCP segment, all non-available data sub-flows from the plurality of data sub-flows. Thus, the data sub-flow may be selected more efficiently.

In an embodiment, the scheduler is configured to determine at least one latency indicator, wherein the at least one latency indicator indicates a respective latency of a respective data sub-flow, wherein the scheduler is configured to select, for the TCP segment, the data sub-flow from the plurality of data sub-flows further based on the at least one latency indicator. Thus, the data sub-flow may be selected by further considering at least one latency of a respective data sub-flow.

In an embodiment, the scheduler is configured to determine a sub-group of the plurality of data sub-flows, wherein each data sub-flow within the sub-group is associated with the highest priority, wherein the selected data sub-flow is further associated with the lowest latency within the sub-group. Thus, the data sub-flow having the lowest latency may be selected if at least two data sub-flows are associated with the same highest priority.

In an embodiment, the scheduler is configured to determine the at least one latency indicator based on at least one TCP transmission acknowledgement (ACK) message associated with at least one previous TCP segment. Thus, the scheduler may determine the at least one latency indicator using inherent present latency information provided by the Multipath Transmission Control Protocol (MPTCP).

In an embodiment, the plurality of data sub-flows is associated with a plurality of sockets, wherein each data sub-flow is associated with a respective socket, wherein the scheduler is configured to select a socket from the plurality of sockets, wherein the selected socket is associated with the selected data sub-flow, wherein the communication interface is configured to transmit the TCP segment via the selected data sub-flow to the further communication device using the selected socket. Thus, the TCP segment can be transmitted more efficiently.

In an embodiment, the communication interface is configured to communicate via at least one data sub-flow of the plurality of data sub-flows using a first radio access technology, and to communicate via at least one data sub-flow of the plurality of data sub-flows using a second radio access technology, wherein the first radio access technology and the second radio access technology are different. Thus, a plurality of consecutive TCP segments may be transmitted using different radio access technologies; thereby increasing transmission reliability over the Multipath Transmission Control Protocol (MPTCP).

The communication interface may comprise a first sub-interface for communicating using the first radio access technology and a second sub-interface for communicating using the second radio access technology.

In an embodiment, the communication interface is configured to communicate concurrently using the first radio access technology and the second radio access technology. A switching between the first radio access technology and the second radio access technology may be performed for each TCP segment of the plurality of consecutive TCP segments. Thus, no deactivation and/or reactivation of a respective radio access technology may be required.

In an embodiment, the first radio access technology is a Wi-Fi radio access technology, and the second radio access technology is a mobile, in particular a Long Term Evolution (LTE), radio access technology. Thus, complementary radio access technologies in terms of coverage and/or data rate may be used; thereby further increasing transmission reliability over the Multipath Transmission Control Protocol (MPTCP).

According to a second aspect, the invention relates to a network entity for determining at least one priority indicator being associated with a respective data sub-flow. The network entity comprises a processor configured to determine a plurality of cost parameters of the plurality of data sub-flows, wherein each cost parameter indicates a cost of a respective data sub-flow, to determine a plurality of priorities of the plurality of data sub-flows based on the plurality of cost parameters, and to generate the at least one priority indicator based on the plurality of priorities. The network entity further comprises a communication interface configured to transmit the at least one priority indicator to a communication device. The network entity may e.g. be a dedicated server, e.g. within a core network of the communication network.

A respective cost parameter may e.g. represent a respective cost associated with an available data rate of a respective data sub-flow, an error rate of a respective data sub-flow, or a reliability of a respective data sub-flow.

In an embodiment, the network entity comprises a monitoring unit configured to monitor at least one data sub-flow of the plurality of data sub-flows. Thus, the at least one cost parameter of the at least one data sub-flow may efficiently be determined.

In an embodiment, the network entity comprises a memory configured to store at least one cost parameter of the at least one data sub-flow. Thus, the at least one cost parameter may efficiently be provided. The at least one cost parameter may e.g. be predefined by a mobile network operator (MNO) operating the network entity.

As an example, it may be known to the mobile network operator (MNO) that a data sub-flow transmitted over a mobile radio network portion may be more expensive in terms of available data rate, error rate, or reliability than a data sub-flow transmitted over a fixed line network portion of the communication network.

According to a third aspect, the invention relates to a communication system for transmitting a Transmission Control Protocol (TCP) segment over a communication network using a Multipath Transmission Control Protocol (MPTCP). The communication system comprises a communication device according to the first aspect of the invention, and a further communication device.

In an embodiment, the communication system further comprises a network entity according to the second aspect of the invention. Thus, the at least one priority indicator may be provided to the communication device and/or the further communication device efficiently.

According to a fourth aspect, the invention relates to a method for transmitting a Transmission Control Protocol (TCP) segment over a communication network using a Multipath Transmission Control Protocol (MPTCP). The method comprises establishing, by a communication interface, an MPTCP data flow comprising a plurality of data sub-flows to a further communication device, receiving, by the communication interface, at least one priority indicator from a network entity, wherein the at least one priority indicator indicates a respective priority of a respective data sub-flow, selecting, by a scheduler, for the TCP segment, a data sub-flow from the plurality of data sub-flows based on the at least one priority indicator, and transmitting, by the communication interface, the TCP segment via the selected data sub-flow to the further communication device.

The method may be performed by the communication device according to the first aspect of the invention. Further features of the method directly result from the functionality and/or features of the communication device according to the first aspect of the invention.

According to a fifth aspect, the invention relates to a computer program comprising a program code for performing the method according to the fourth aspect of the invention, when executed by a communication device.

The invention can be implemented in hardware and/or software.

FIG. 1 shows a schematic diagram of a communication device 100 for transmitting a Transmission Control Protocol (TCP) segment over a communication network using a Multipath Transmission Control Protocol (MPTCP). The communication device 100 comprises a communication interface 101 configured to establish an MPTCP data flow comprising a plurality of data sub-flows to a further communication device, and to receive at least one priority indicator from a network entity, wherein the at least one priority indicator indicates a respective priority of a respective data sub-flow. The communication device 100 may comprise a memory configured to store at least one priority indicator, wherein the at least one priority indicator indicates a respective priority of a respective data sub-flow. The at least one priority indicator received from the network entity and the at least one priority indicator stored in the memory may together provide the plurality of priorities of the plurality of data sub-flows. The communication device 100 further comprises a scheduler 103 configured to select, for the TCP segment, a data sub-flow from the plurality of data sub-flows based on the at least one priority indicator. The communication interface is configured to transmit the TCP segment via the selected data sub-flow to the further communication device.

The communication interface 100 may comprise a first sub-interface for communicating using a first radio access technology and a second sub-interface for communicating using a second radio access technology. The at least one priority indicator may be received by any one of the first sub-interface or the second sub-interface. At least one data sub-flow of the plurality of data sub-flows may be associated with the first sub-interface or first radio access technology, respectively, and at least one data sub-flow of the plurality of data sub-flows may be associated with the second sub-interface or second radio access technology, respectively. The first radio access technology may e.g. be a Wi-Fi radio access technology, and the second radio access technology may e.g. be a mobile, in particular a Long Term Evolution (LTE), radio access technology.

A respective priority of a respective data sub-flow may be associated with the type of the radio access technology. For example, the at least one data sub-flow being associated with the LTE radio access technology may have a lower priority than the at least one data sub-flow being associated with the Wi-Fi radio access technology. Such association of priorities may preferably be indicated by priority indicators stored in the memory, and may not be provided by the network entity, since it may be known that a cost parameter relating to the LTE radio access technology may in general be higher than a cost parameter relating to the Wi-Fi radio access technology.

Figure 2:
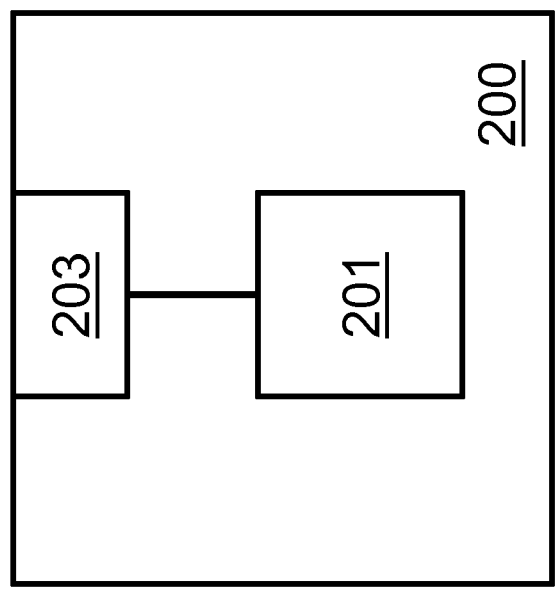
FIG. 2 shows a schematic diagram of a network entity.

FIG. 2 shows a schematic diagram of a network entity 200 for determining at least one priority indicator being associated with a respective data sub-flow. The network entity 200 comprises a processor 201 configured to determine a plurality of cost parameters of the plurality of data sub-flows, wherein each cost parameter indicates a cost of a respective data sub-flow, to determine a plurality of priorities of the plurality of data sub-flows based on the plurality of cost parameters, and to generate the at least one priority indicator based on the plurality of priorities. The network entity 200 further comprises a communication interface 203 configured to transmit the at least one priority indicator to a communication device. The network entity 200 may e.g. be a dedicated server, e.g. within a core network of the communication network.

Figure 3:
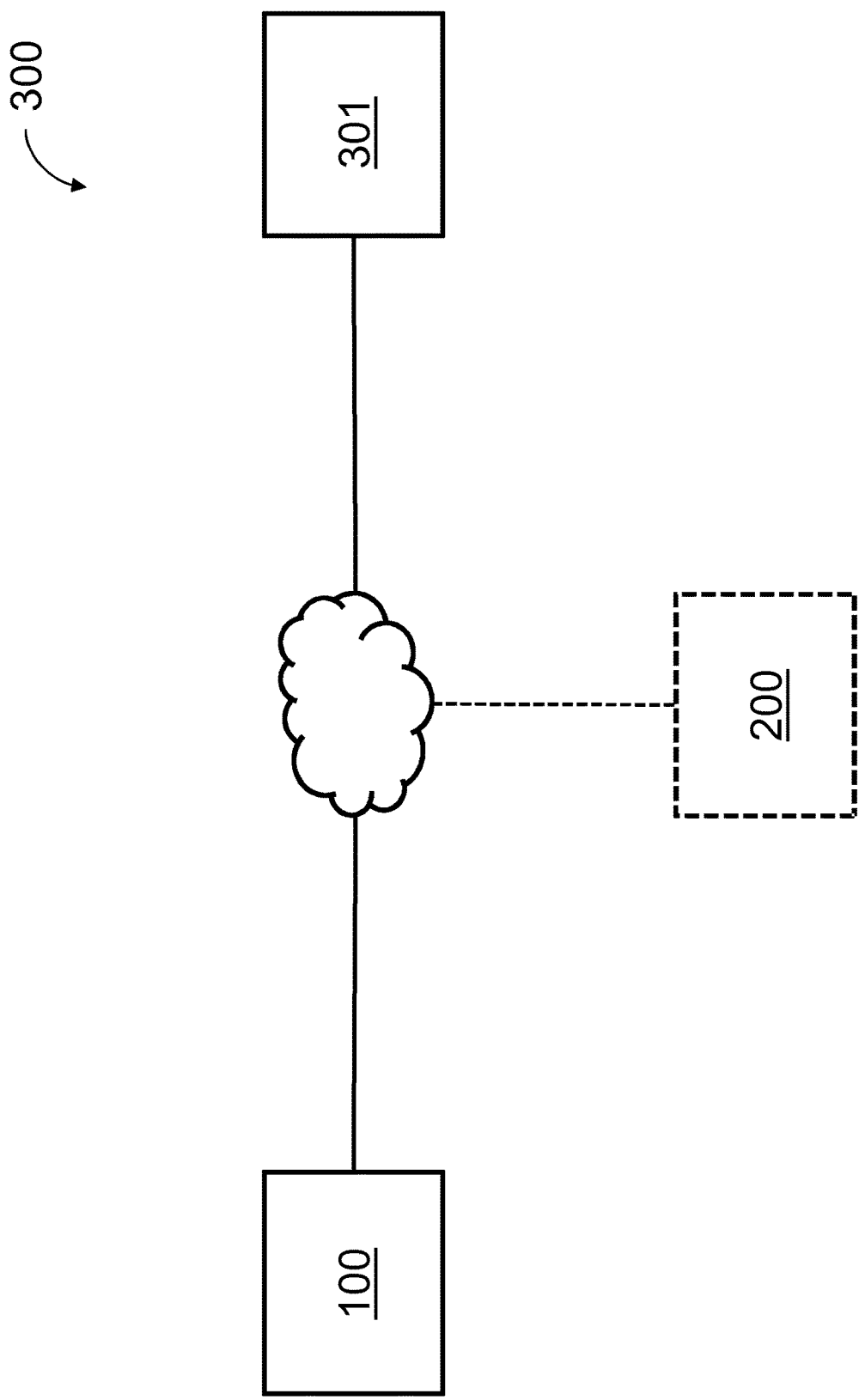
FIG. 3 shows a schematic diagram of a communication system.

FIG. 3 shows a schematic diagram of a communication system 300 for transmitting a Transmission Control Protocol (TCP) segment over a communication network using a Multipath Transmission Control Protocol (MPTCP). The communication system 300 comprises a communication device 100 and a further communication device 301. The communication system 300 may further comprise a network entity 200.

The further communication device 301 may be an arbitrary communication device able to communicate using the Multipath Transmission Control Protocol (MPTCP). The further communication device 301 may, however, have the same functionality and/or features as the communication device 100.

The network entity 200 may transmit at least one priority indicator indicating a respective priority of a respective data sub-flow to the communication device 100 and/or to the further communication device 301 over the communication network. The communication device 100 may be configured to forward the at least one priority indicator to the further communication device 301, or vice versa. Thus, the at least one priority indicator may be exchanged between the communication device 100 and the further communication device 301, in particular if a respective priority indicated by the at least one priority indicator changes. This may allow for mutual adapting the scheduling of the communication device 100 and the further communication device 301.

As an example, the communication device 100 and the further communication device 301 communicate using the Multipath Transmission Control Protocol (MPTCP). The communication device 100 may receive at least one priority indicator from the network entity 200 and may use the received at least one priority indicator for scheduling or traffic distribution to the further communication device 301. The communication device 100 may forward the at least one priority indicator to the further communication device 301. The further communication device 301 may use the received at least one priority indicator for scheduling or traffic distribution to the communication device 100.

Figure 4:
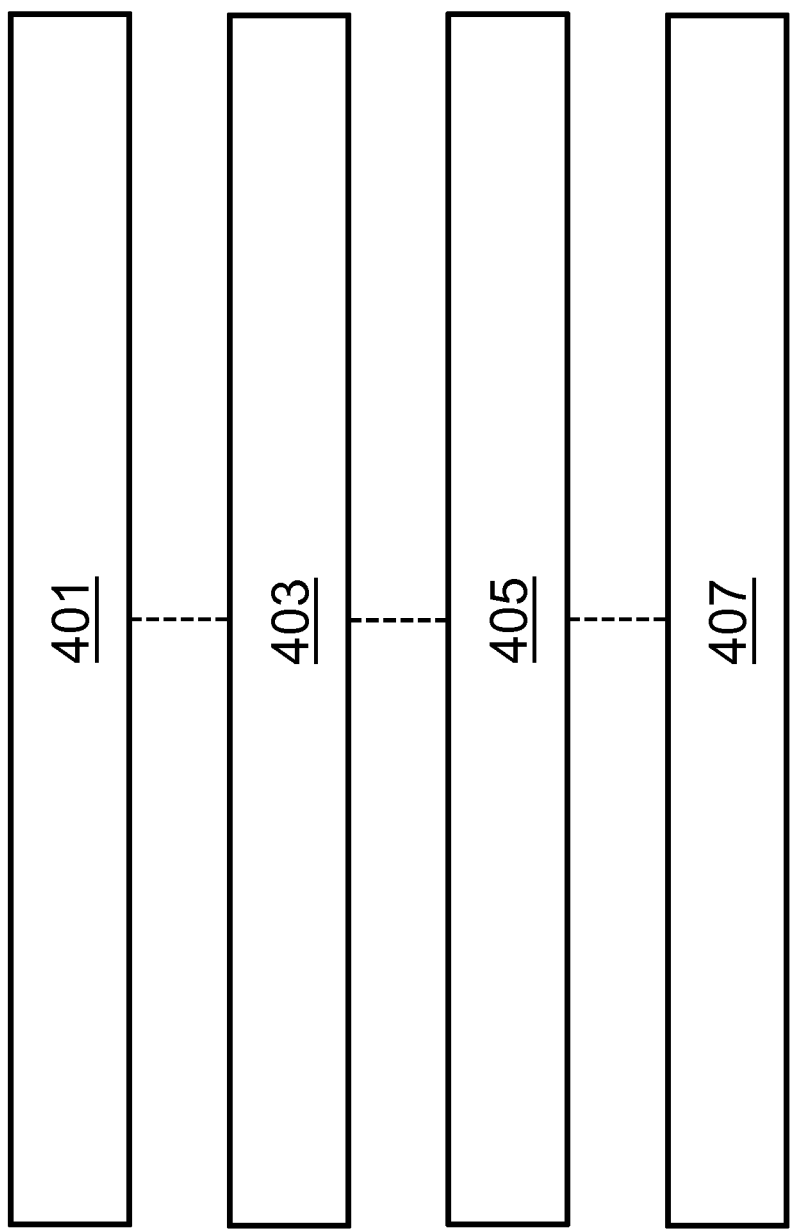
FIG. 4 shows a schematic diagram of a method.

FIG. 4 shows a schematic diagram of a method 400 for transmitting a Transmission Control Protocol (TCP) segment over a communication network using a Multipath Transmission Control Protocol (MPTCP). The method 400 comprises establishing 401, by a communication interface, an MPTCP data flow comprising a plurality of data sub-flows to a further communication device, receiving 403, by the communication interface, at least one priority indicator from a network entity, wherein the at least one priority indicator indicates a respective priority of a respective data sub-flow, selecting 405, by a scheduler, for the TCP segment, a data sub-flow from the plurality of data sub-flows based on the at least one priority indicator, and transmitting 407, by the communication interface, the TCP segment via the selected data sub-flow to the further communication device.

Figure 5:
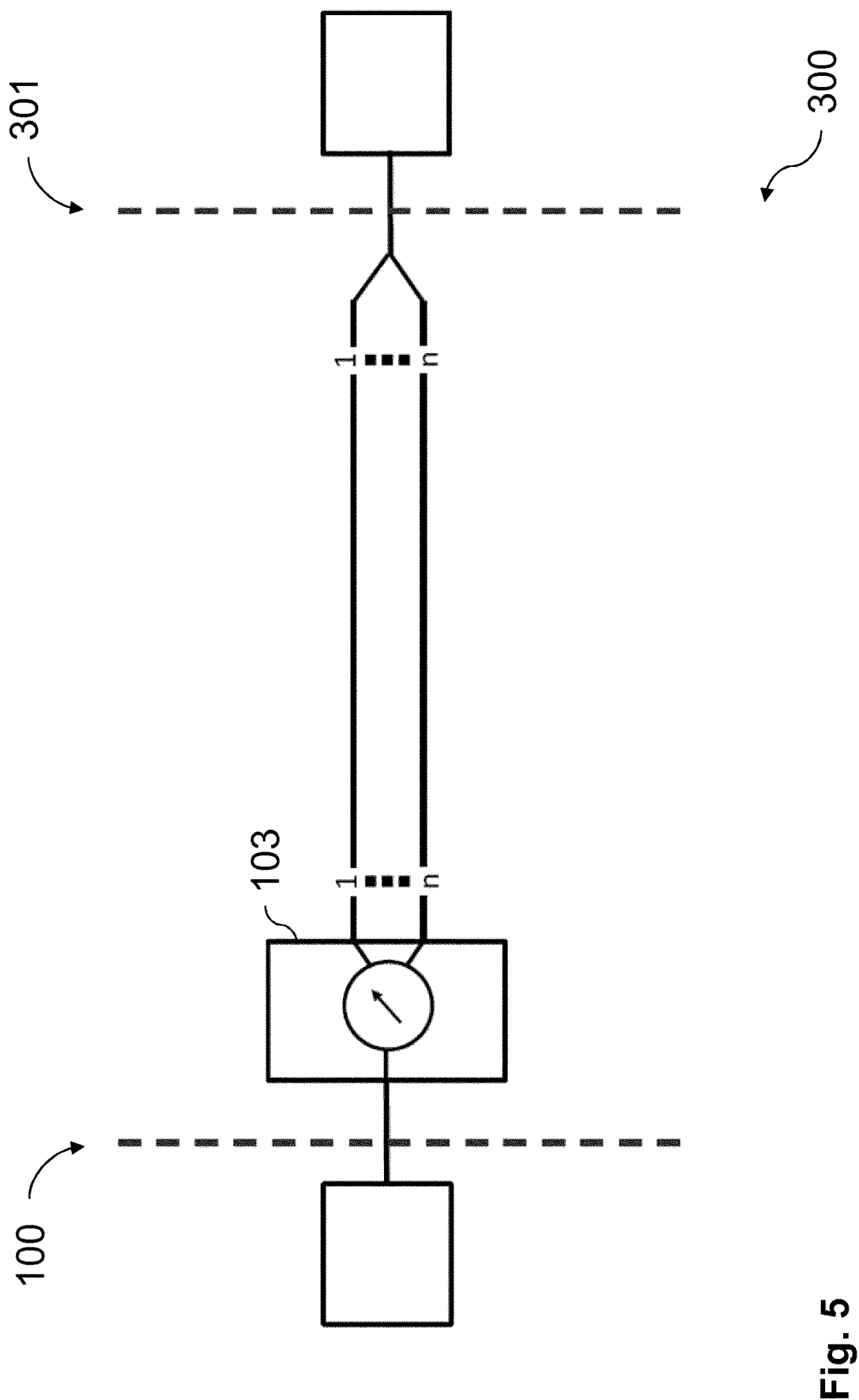
FIG. 5 shows a schematic diagram of a communication system.

FIG. 5 shows a schematic diagram of a communication system 300 for transmitting a Transmission Control Protocol (TCP) segment over a communication network using a Multipath Transmission Control Protocol (MPTCP). The communication system 300 comprises a communication device 100 with a scheduler 103 and a further communication device 301. Each data sub-flow of the plurality of data sub-flows is referred to by a respective index number 1 to n. The scheduler 103 may detect that a currently high prioritized and/or used data sub-flow becomes unavailable by losing its capability to transmit a TCP segment, and may switch to a lower prioritized data sub-flow, which has the highest priority of all remaining available data sub-flows.

Figure 6:
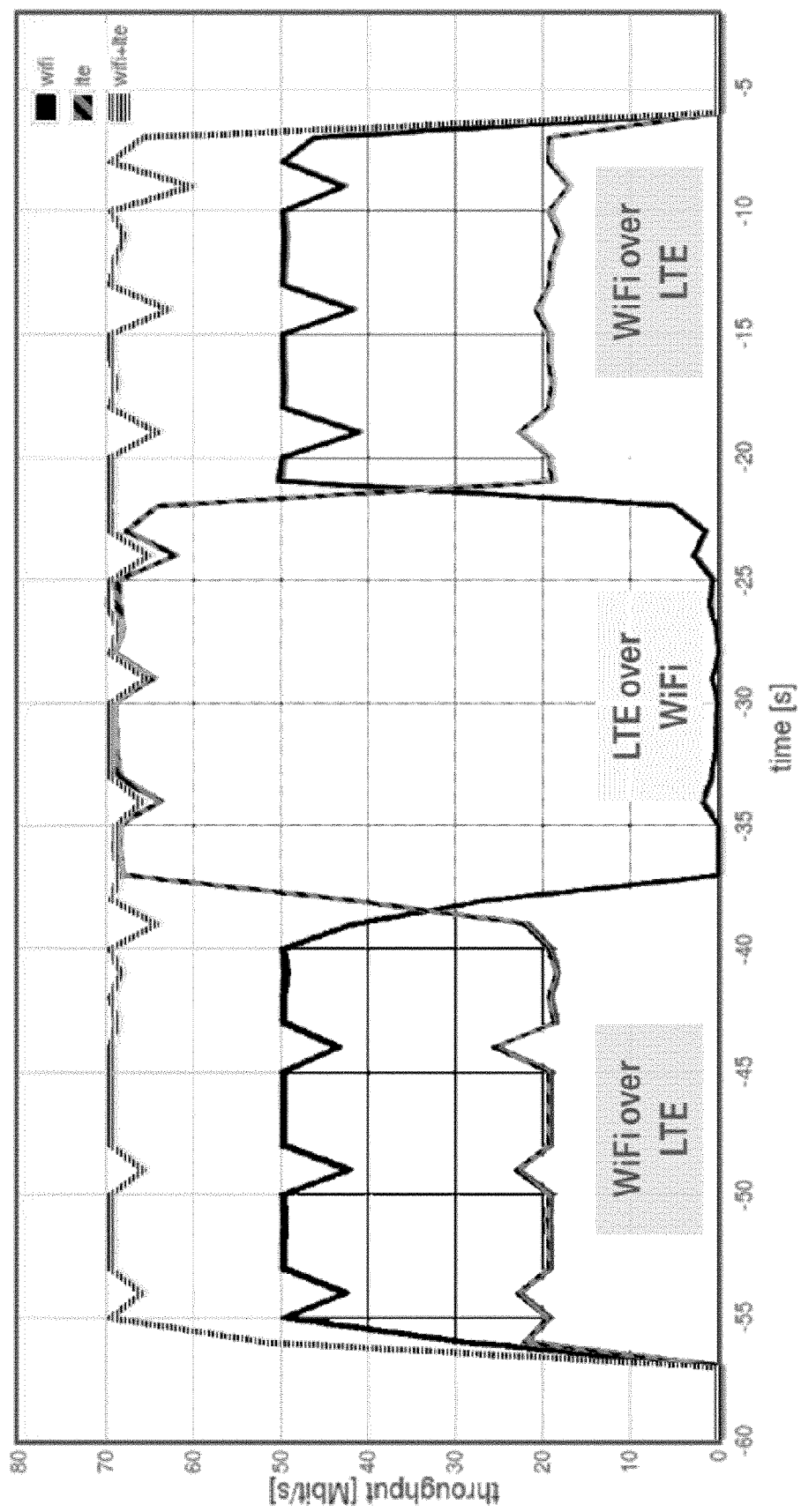
FIG. 6 shows a schematic diagram of a switching between radio access technologies.

FIG. 6 shows a schematic diagram of a switching between radio access technologies. At least one data sub-flow of the plurality of data sub-flows is associated with a Wi-Fi radio access technology as first radio access technology, and at least one data sub-flow of the plurality of data sub-flows is associated with a Long Term Evolution (LTE) radio access technology as a second radio access technology. An overall throughput of 70 Mbit/s may be realized using the Wi-Fi radio access technology and the Long Term Evolution (LTE) radio access technology, wherein the Wi-Fi radio access technology has a maximum throughput of 50 Mbit/s in this example.

In a first time interval, e.g. between −55 s and −40 s, the throughput of the Wi-Fi radio access technology is over the throughput of the Long Term Evolution (LTE) radio access technology. In a second time interval, e.g. between −35 s and −25 s, the throughput of the Long Term Evolution (LTE) radio access technology is over the throughput of the Wi-Fi radio access technology. In a third time interval, e.g. between −20 s and −7.5 s, the throughput of the Wi-Fi radio access technology is over the throughput of the Long Term Evolution (LTE) radio access technology. The Wi-Fi radio access technology and the Long Term Evolution (LTE) radio access technology are used concurrently to communicate.

Consequently, several data sub-flows may be combined for capacity aggregation, wherein the prioritization may be kept active. The usage of high-prioritized data sub-flows can be ensured up to the respective data rate limit or capacity limit. On top, lower prioritized data sub-flows can be used e.g. in a given order. The communication device may thus be suited for bundling multiple paths for capacity aggregation in combination with traffic prioritization.

Figure 7:
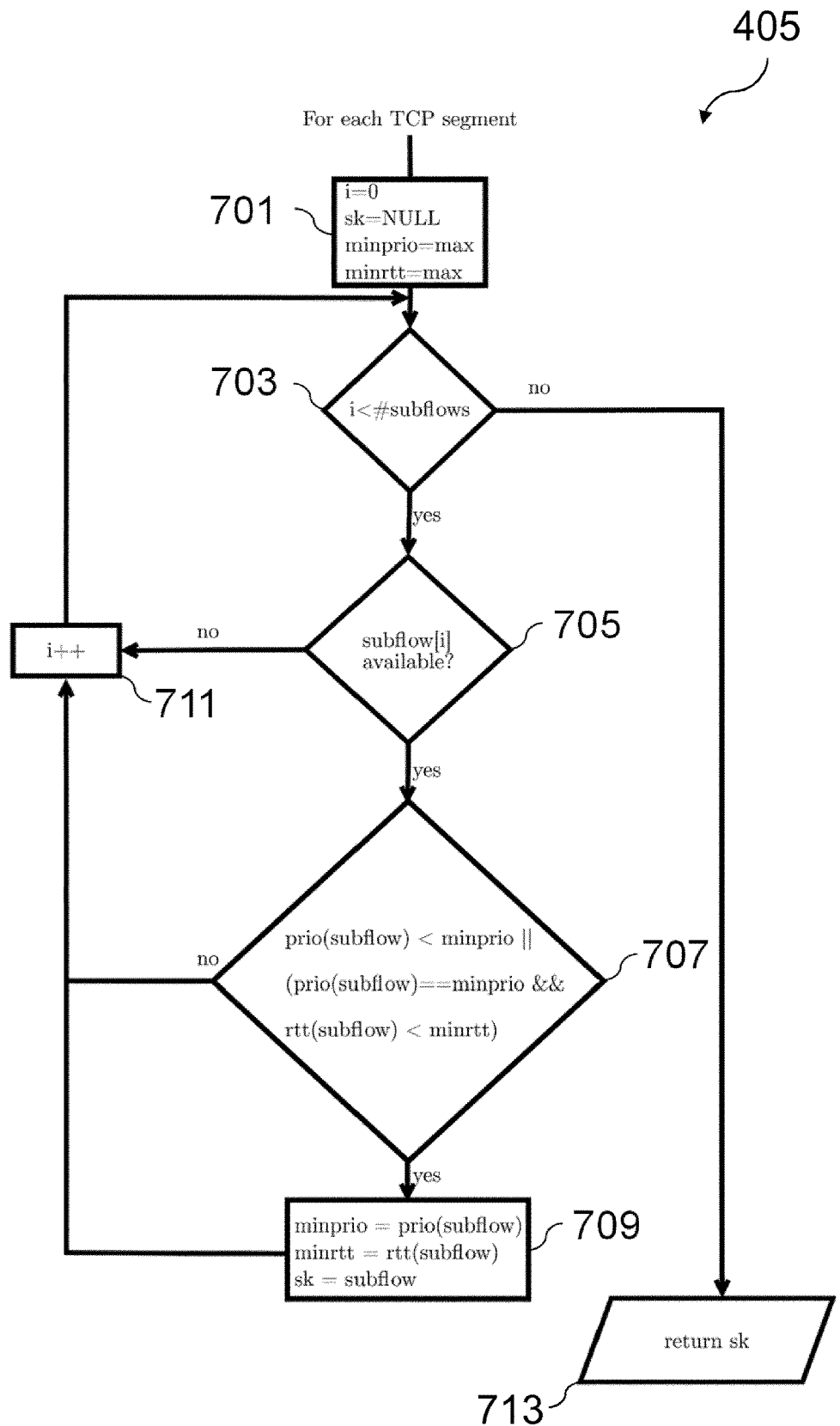
FIG. 7 shows a schematic flow diagram of a scheduling to be performed by a scheduler.

FIG. 7 shows a schematic flow diagram of a scheduling to be performed by a scheduler. The flow diagram provides further features of the step of selecting 405 of a data sub-flow from the plurality of data sub-flows as shown in FIG. 4. Whenever the scheduler may have to take a decision, it may run through sub-steps 701 to 713 and may return the socket (sk), which the selected data sub-flow is associated with. The selected data sub-flow may have the highest priority (prio), wherein, in this example, a low numerical value is assumed to relate to a high priority within an available data sub-flow. If several data sub-flows exist with the same highest priority, the data sub-flow with the lowest latency within this sub-group may be selected. In this example, the latency is represented by the round-trip-time (rtt). Other mechanisms for capacity estimation may equally be applied, as well as another handling approach if several data sub-flows have the same priority or cost.

The sub-steps 701 to 713 are performed by the scheduler for each TCP segment to be transmitted. The sub-steps 701 to 713 will be described in more detail in the following:

In sub-step 701, a counter variable "i" is initialized to "0", a socket variable ("sk") is initialized to "NULL", a minimum priority value ("minprio") is initialized to a predefined maximum value, and a minimum latency value ("minrtt") is initialized to a predefined maximum value.

In sub-step 703, the current counter variable "i" is compared with the number of data sub-flows ("#subflows"). If the current counter variable "i" is smaller than the number of data sub-flows ("#subflows"), the procedure proceeds with sub-step 705; otherwise with sub-step 713.

In sub-step 705, it is verified whether the current data sub-flow indexed by the counter variable "i" ("subflow[i]") is available, e.g. able to transmit data. If the current data sub-flow indexed by the counter variable "i" ("subflow[i]") is available, the procedure proceeds with sub-step 707; otherwise with sub-step 711.

In sub-step 707, it is verified whether the priority of the current data sub-flow ("prio(subflow)") is smaller than the current minimum priority value ("minprio"). Furthermore, if the priority of the current data sub-flow ("prio(subflow)") is equal to the current minimum priority value ("minprio"), it is verified whether the latency of the current data sub-flow ("rtt(subflow)") is smaller than the current minimum latency value ("minrtt"). If any of these two alternatives applies, the procedure proceeds with sub-step 709; otherwise with sub-step 711.

In sub-step 709, the minimum priority value ("minprio") is updated to the priority of the current data sub-flow. Furthermore, the minimum latency value ("minrtt") is updated to the latency of the current data sub-flow. Moreover, the socket variable ("sk") is updated such as to correspond to the current data sub-flow. The procedure proceeds with sub-step 711.

In sub-step 711, the counter variable "i" is incremented by "1" ("i++"). The procedure proceeds with sub-step 703. By incrementing the counter variable "i" and proceeding with sub-step 703, and repeating the procedure, a searching loop is realized, which searches for the data sub-flow having the highest priority as a primary criterion and the lowest latency as a secondary criterion. If all data sub-flows have been searched, the search loop terminates and proceeds with sub-step 713.

In sub-step 713, the socket variable ("sk") corresponding to the socket of the selected data sub-flow is returned.

As can be seen from the foregoing, in an exemplary embodiment, a path prioritization scheduling decision based on external and inherent information associated with the data sub-flows can be realized. The priorities may be provided using at least one priority indicator. The latencies may be provided using at least one latency indicator, wherein TCP transmission acknowledgement (ACK) messages may be exploited for determining the respective latencies.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

100 Communication device
101 Communication interface
103 Scheduler
200 Network entity
201 Processor
203 Communication interface
300 Communication system
301 Further communication device
400 Method
401 Establishing
403 Receiving
405 Selecting
407 Transmitting
701 Sub-step
703 Sub-step
705 Sub-step
707 Sub-step
709 Sub-step
711 Sub-step
713 Sub-step

The invention claimed is:

1. A communication device for transmitting a Transmission Control Protocol (TCP) segment over a communication network using a Multipath Transmission Control Protocol (MPTCP), the communication device comprising:
a communication interface configured to:
establish an MPTCP data flow comprising a plurality of data sub-flows to a further communication device, wherein the plurality of data sub-flows is combined for capacity aggregation; and
receive a priority indicator from a network entity, wherein the priority indicator indicates a respective priority of a respective data sub-flow of the plurality of data sub-flows; and
a scheduler configured to:
determine a highest priority data sub-flow from the plurality of data sub-flows or a highest priority sub-group of data sub-flows from the plurality of data sub-flows, wherein each data sub-flow within the highest priority sub-group has a same highest priority;
determine a latency indicator indicating a respective latency of a respective data sub-flow; and
select, for the TCP segment, a data sub-flow from the plurality of data sub-flows based on the priority indicator as a primary criterion and based on the latency indicator as a secondary criterion by selecting the highest priority data sub-flow and, in case of there being at least two data sub-flows having the same highest priority, selecting the data sub-flow having the lowest latency out of the at least two data sub-flows having the same highest priority;
wherein the communication interface is further configured to transmit the TCP segment via the selected data sub-flow to the further communication device.

2. The communication device of claim 1, wherein the scheduler is further configured to determine, for the TCP segment, a respective availability status of each data sub-flow of the plurality of data sub-flows, and to discard, for the TCP segment, all non-available data sub-flows from the plurality of data sub-flows.

3. The communication device of claim 1, wherein the scheduler is further configured to determine the latency indicator based on at least one TCP transmission acknowledgement (ACK) message associated with at least one previous TCP segment.

4. The communication device of claim 1, wherein the plurality of data sub-flows is associated with a plurality of sockets, wherein each data sub-flow is associated with a respective socket, wherein the scheduler is further configured to select a socket from the plurality of sockets, wherein the selected socket is associated with the selected data sub-flow, and wherein the communication interface is further configured to transmit the TCP segment via the selected data sub-flow to the further communication device using the selected socket.

5. The communication device of claim 1, wherein the communication interface is further configured to communicate via at least one data sub-flow of the plurality of data sub-flows using a first radio access technology, and to communicate via at least one data sub-flow of the plurality of data sub-flows using a second radio access technology, wherein the first radio access technology and the second radio access technology are different.

6. The communication device of claim 5, wherein the communication interface is further configured to communicate concurrently using the first radio access technology and the second radio access technology.

7. The communication device of claim 5, wherein the first radio access technology is a Wi-Fi radio access technology, and wherein the second radio access technology is a mobile radio access technology.

8. A communication system for transmitting a Transmission Control Protocol (TCP) segment over a communication network using a Multipath Transmission Control Protocol (MPTCP), the communication system comprising:
   a communication device; and
   a further communication device; and
   a network entity;
   wherein the communication device is configured to:
      establish an MPTCP data flow comprising a plurality of data sub-flows to the further communication device, wherein the plurality of data sub-flows is combined for capacity aggregation;
      receive a priority indicator from the network entity, wherein the priority indicator indicates a respective priority of a respective data sub-flow of the plurality of data sub-flows;
      determine a highest priority data sub-flow from the plurality of data sub-flows or a highest priority sub-group of data sub-flows from the plurality of data sub-flows, wherein each data sub-flow within the highest priority sub-group has a same highest priority;
      determine a latency indicator indicating a respective latency of a respective data sub-flow;
      select, for the TCP segment, a data sub-flow from the plurality of data sub-flows based on the priority indicator as a primary criterion and based on the latency indicator as a secondary criterion by selecting the highest priority data sub-flow and, in case of there being at least two data sub-flows having the same highest priority, selecting the data sub-flow having the lowest latency out of the at least two data sub-flows having the same highest priority; and
      transmit the TCP segment via the selected data sub-flow to the further communication device;
   wherein the network entity is configured to:
      determine a plurality of cost parameters of the plurality of data sub-flows, wherein each cost parameter indicates a cost of a respective data sub-flow, to determine a plurality of priorities of the plurality of data sub-flows based on the plurality of cost parameters;
      generate the priority indicator based on the plurality of priorities; and
      transmit the priority indicator to the communication device.

9. The communication system of claim 8, wherein the network entity is a dedicated server within a core network of the communication network.

10. A method for transmitting a Transmission Control Protocol (TCP) segment over a communication network using a Multipath Transmission Control Protocol (MPTCP), the method comprising:
   establishing, by a communication device, an MPTCP data flow comprising a plurality of data sub-flows to a further communication device, wherein the plurality of data sub-flows is combined for capacity aggregation;
   receiving, by the communication device, a priority indicator from a network entity, wherein the priority indicator indicates a respective priority of a respective data sub-flow of the plurality of data sub-flows;
   determining, by the communication device, a latency indicator indicating a respective latency of a respective data sub-flow;
   determining, by the communication device, a highest priority data sub-flow from the plurality of data sub-flows or a highest priority sub-group of data sub-flows from the plurality of data sub-flows, wherein each data sub-flow within the highest priority sub-group has a same highest priority;
   determining, by the communication device, a latency indicator indicating a respective latency of a respective data sub-flow;
   selecting, by the communication device, for the TCP segment, a data sub-flow from the plurality of data sub-flows based on the priority indicator as a primary criterion and based on the latency indicator as a secondary criterion by selecting the highest priority data sub-flow and, in case of there being at least two data sub-flows having the same highest priority, selecting the data sub-flow having the lowest latency out of the at least two data sub-flows having the same highest priority; and
   transmitting, by the communication device, the TCP segment via the selected data sub-flow to the further communication device.

11. A non-transitory computer-readable medium having processor-executable instructions stored thereon, wherein the processor-executable instructions, when executed, facilitate performance of the method of claim 10.

* * * * *